United States Patent
Kim et al.

[11] Patent Number: 5,995,277
[45] Date of Patent: Nov. 30, 1999

[54] OPTICAL FIBER AMPLIFIER WITH ABSORBER

[75] Inventors: Jeong-mee Kim; Sung-jun Kim, both of Kyungki-do, Rep. of Korea

[73] Assignee: Samsung Electronics Co., Ltd., Kyungki-do, Rep. of Korea

[21] Appl. No.: 09/106,355

[22] Filed: Jun. 29, 1998

[30] Foreign Application Priority Data

Jun. 30, 1997 [KR] Rep. of Korea ............ 97-29328

[51] Int. Cl.⁶ .................. H01S 3/30; H01S 3/07; G02F 1/35
[52] U.S. Cl. ............ 359/341; 359/134; 359/160; 359/337; 372/6; 372/70
[58] Field of Search ................. 359/134, 160, 359/174, 337, 341, 345; 372/6, 70

[56] References Cited

U.S. PATENT DOCUMENTS

| | | | |
|---|---|---|---|
| 5,050,949 | 9/1991 | DiGiovanni et al | 359/341 |
| 5,115,338 | 5/1992 | DiGiovanni et al. | 359/337 |
| 5,280,383 | 1/1994 | Federici et al. | 372/6 |
| 5,363,234 | 11/1994 | Newhouse et al. | 359/337 |
| 5,406,411 | 4/1995 | Button et al. | 359/341 |
| 5,430,572 | 7/1995 | DiGiovanni et al. | 359/341 |
| 5,506,723 | 4/1996 | Junginger | 359/134 |
| 5,673,280 | 9/1997 | Grubb et al. | 375/6 |
| 5,701,194 | 12/1997 | Meli et al. | 359/341 |
| 5,808,786 | 9/1998 | Shibuya | 359/341 |

FOREIGN PATENT DOCUMENTS

| | | |
|---|---|---|
| 2765422 | 12/1998 | France . |
| 5226734 | 9/1993 | Japan . |
| 9326519 | 12/1997 | Japan . |
| 1022555 | 1/1998 | Japan . |
| 10107351 | 4/1998 | Japan . |

OTHER PUBLICATIONS

Bjarklev, A.; Optical Fiber Amplifiers, ISBN 0–89006–659–0, pp. 196 & 160, 1993.

Masuda et al, Electronics Letters, vol. 26, #10, pp. 661–662; Abst. only herewith, May 1, 1990.

*Primary Examiner*—Nelson Moskowitz
*Attorney, Agent, or Firm*—Leydig, Voit & Mayer, Ltd.

[57] ABSTRACT

An optical fiber amplifier with an absorber, including a first amplification unit for amplifying an input signal light, using first pump light; an absorption unit for separating the signal light and the pump light from the output light of the first amplification unit and absorbing a light signal in a wavelength range; and a second amplification unit for amplifying the signal light output by the absorption unit, using second pump light. The optical fiber amplifier can be easily manufactured by adding an absorber, an erbium doped fiber, to a conventional optical fiber amplifier. The characteristics of the optical fiber amplifier can be easily changed by controlling the length of the absorber.

3 Claims, 2 Drawing Sheets

OPTICAL FIBER AMPLIFIER WITH ABSORBER

BACKGROUND OF THE INVENTION

1. Field of the Invention

The present invention relates to an optical fiber amplifier with an absorber, and more particularly, to an optical fiber amplifier having an absorber for absorbing a signal light having a predetermined wavelength range.

2. Description of the Related Art

An erbium doped fiber amplifier (EDFA) periodically amplifies a weakened optical signal to make up for attenuation of the optical signal due to long distance transmission, when a great amount of data is transmitted over a long distance via an optical fiber. The EDFA directly amplifies light without transforming the light temporarily into electricity for amplification. Thus, the EDFA is effective and economical in amplification.

FIG. 1 shows the structure of a conventional EDFA. The EDFA shown in FIG. 1 comprises a first isolator 100, a first pump light source 102, a first wavelength selective coupler (WSC) 104, an Erbium Doped Fiber (EDF) 106, a second WSC 108, a second pump light source 110, and a second isolator 112.

The operation of the EDFA in FIG. 1 will now be described. First, the first and second pump light sources 102 and 110 inject pump light having a center wavelength of 980 nm. The first and second WSCs 104 and 108 couple the pump light to a signal light having a 1500 nm band which is input via their respective input ports. The pump light excites erbium ions in a ground state in the EDF 106. A signal light is amplified by stimulated emission of excited erbium ions. The amplified signal light is output to the second isolator 112 via the second WSC 108.

The first isolator 100 prevents efficiency of amplification of the signal light from being degraded by amplified spontaneous emission (ASE) from the EDF 106, which is reflected by an optical device, such as a signal input connector, and reenters the EDF 106. Similarly, the second isolator 112 prevents efficiency of amplification from being degraded by the ASE which is reflected by an optical device, such as a signal output connector and reenters the EDF 106.

However, the EDFA has different amplification gains depending on wavelength. In particular, ASE in 1530 nm band is strong, and a gain within this range is high. As a result, the gain in a 1550 nm wavelength band, which is often used for transmission, is reduced and the noise figure increases, thus widening the difference in the gain of the EDFA between wavelengths.

Also, when EDFAs are connected in the middle of a system to amplify an optical signal weakened during transmission, gain is considerably higher in the 1530 nm wavelength band than in other wavelength ranges. Therefore, gain peaking occurs in the 1530 nm wavelength band.

SUMMARY OF THE INVENTION

To solve the above problems, it is an objective of the present invention to provide an optical fiber amplifier with an absorber, which includes an erblum doped fiber (EDF) acting as the absorber between EDFs acting as a light amplifying medium, and increases the gain in a wavelength range usually used in optical communication and decreases noise figure, by reducing the gain of a signal light having a 1530 nm wavelength band and then amplifying the signal light Accordingly, to achieve the above objective, there is provided an optical fiber amplifier with an absorber, comprising: a first amplification unit for amplifying an input signal light, using a first pump light; an absorption unit for separating the signal light and the pump light from the output light of the first amplification unit and absorbing a light signal having a predetermined wavelength range; and a second amplification unit for amplifying the output signal light of the absorption unit, using a second pump light.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Figure 1:
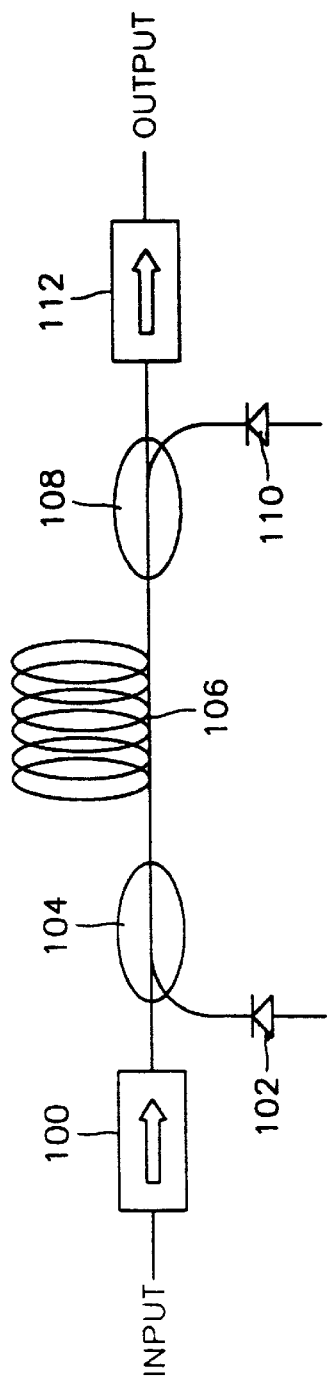
FIG. 1 illustrates the structure of a conventional optical fiber amplifier.
Figure 2:
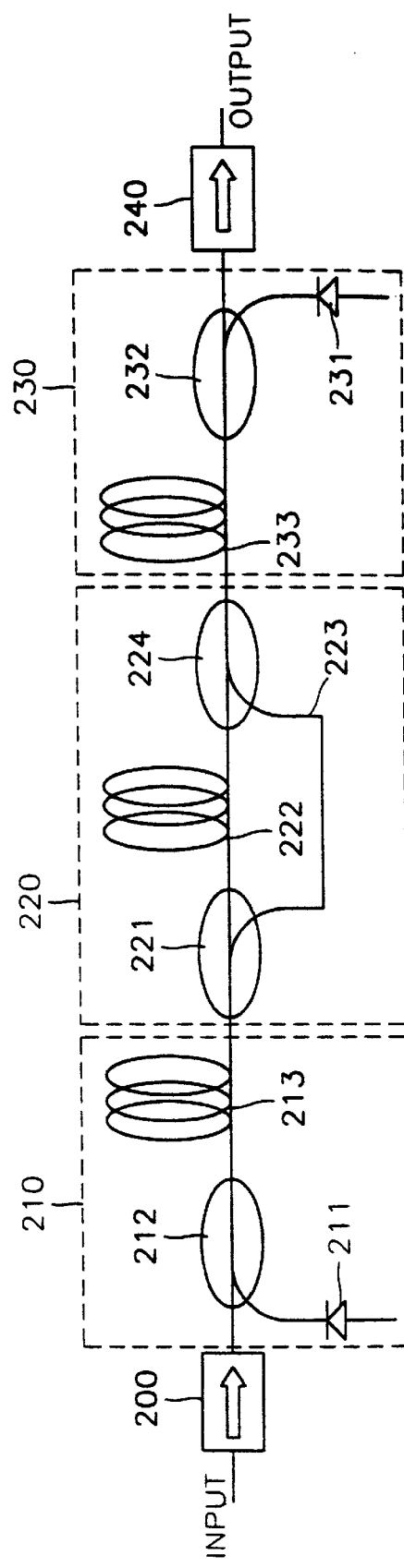
FIG. 2 illustrates the structure of an optical fiber amplifier with an absorber, according to the present invention.

Referring to FIG. 2, an erbium doped fiber amplifier (EDFA) according to the present invention includes a first isolator 200, a first amplification unit 210, an absorption unit 220, a second amplification unit 230, and a second isolator 240.

The first amplification unit 210 amplifies an input signal light using a first pump light, and is comprised of a first pump light source 211, a first wavelength selective coupler (WSC) 212, and a first erblum doped fiber (FDF) 213.

The absorption unit 220 separates a signal light and a pump light from the output light of the first amplification unit 210 and absorbs a signal light having a predetermined wavelength range, and is comprised of a second WSC 221, a second EDF 222, a transmission fiber 223 and a third WSC 224.

The second amplification unit 230 amplifies the output signal light of the absorption unit 220, and is comprised of a second pump light source 231, a fourth WSC 232, and a third EDF 233.

The first pump light source 211 generates a pump light having a center wavelength of 980 nm. The first WSC 212 couples this pump light to a signal light having a 1500 nm wavelength band input via its input port, and transmits the result through one optical fiber. The first EDF 213 amplifies the signal light by stimulated emission of erbium ions excited by the pump light.

The second WSC 221 separates the amplified signal light from the pump light remaining in the first EDF 213. The second EDF 222 absorbs the signal light amplified in a predetermined wavelength range. The transmission fiber 223 transmits the separated pump light. The third WSC 224 couples the light signal passed through the second EDF 222 to the pump light passed through the transmission fiber 223.

The second pump light source 231 generates a pump light having a center wavelength of 980 nm. The generated pump light is incident upon the third EDF 233 via the fourth WSC 232. The incident pump light and the pump light passed through the third WSC 224 excite erbium ions of the third EDF 233. The third EDF 233 amplifies a signal light passed through the third WSC 224, by stimulated emission of the excited erbium ions.

Here, the second and third WSCs 221 and 224 can operate in a direction opposite to the above-described direction. That is, the third WSC 224 separates the residual pump light from the signal light output from the second amplification unit 220. The second WSC 221 couples a signal light passed through the second EDF 222 to the pump light passed through the transmission fiber 223.

The first isolator 200 prevents amplified stimulated emission (ASE) from reentering its input port. The second isolator 240 prevents the output signal from being reflected, reentering through its output port and affecting signal amplification.

Consequently, the incident light signal is primarily amplified by the first amplification unit 210. The ASE is more reduced in the 1530 nm wavelength band than in other wavelengths. Thereafter, the result is secondly amplified by the second amplification unit 230. The pump light remaining in the first and third EDFs 213 and 233 passes through the second and third WSCs 221 and 224, skipping the second EDF 222 which is an absorber.

The absorption coefficient of the second EDF 222 is 12dB/m at a wavelength of 1530 nm and about 4dB/m at a wavelength of 1550 nm. Accordingly, absorption at 1560 nm is about 15% of that at 1530 nm. Thus the second EDF 222 removes ASE having a 1530 nm wavelength band before the second amplification, and excited erbium is used to amplify signals in other wavelength ranges. After the ASE in the 1530 nm wavelength band, obtained by passing through the first amplification unit 210, is absorbed, erbium ions excited by the second amplification unit 230 amplify signals having wavelengths between 1540 nm and 1560 nm, with increased gain and lower noise.

A preferred erbium concentration of the first and third EDFs 213 and 233, used in the present invention, is 165 ppm, and the lengths thereof are 20 m and 13 m, respectively. The second EDF 222, used as an absorber, has an erbium concentration of 200 ppm and is 4 m long. The output power of each pump light source is 90 mW.

Figure 3:
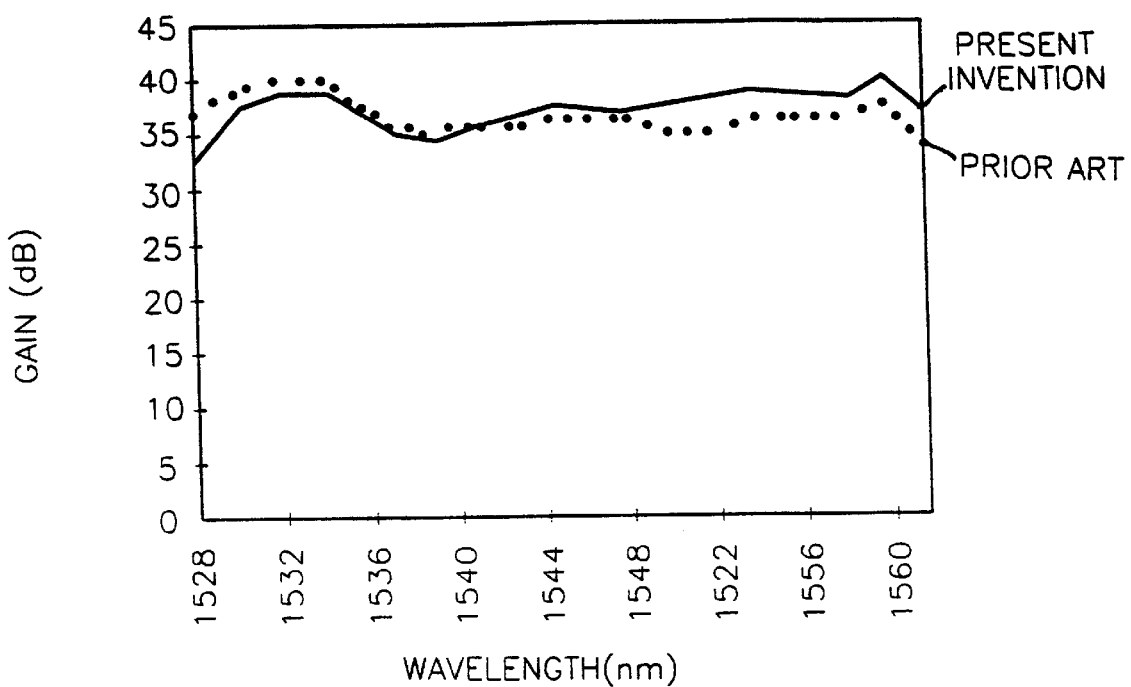
FIG. 3 is a gain vs. wavelength graph of the amplifier of FIG. 2.
Figure 4:
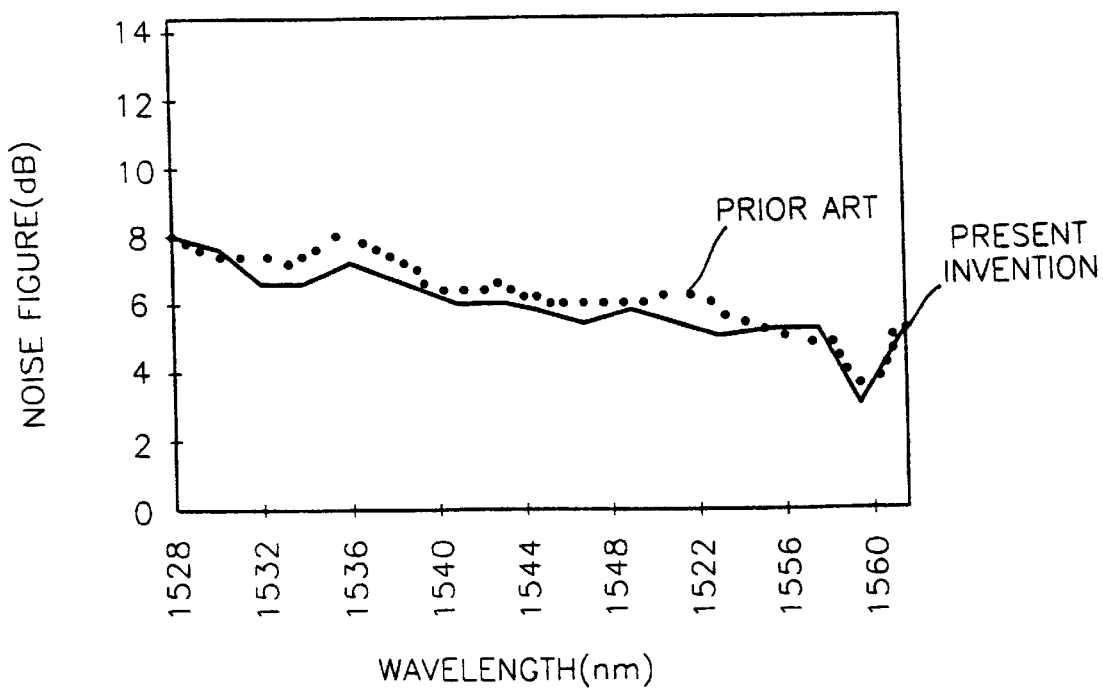
FIG. 4 is a noise vs. wavelength graph of the amplifier of FIG. 2.

FIGS. 3 and 4 are graphs which respectively show gain and noise figure with respect to wavelength, for both a conventional EDFA and the EDFA according to the present invention. A dotted line indicates the characteristics of the conventional EDFA, and a solid line indicates the characteristics of the EDFA according to the present invention. Referring to FIGS. 3 and 4, the gain of the EDFA according to the present invention is about 2 dB lower at wavelengths below 1540 nm, and about 2 dB higher at wavelengths of 1540 nm and higher, compared to the conventional EDFA. The noise figure is reduced over the entire wavelength range.

According to the present invention, the EDFA can be easily manufactured by adding an absorber formed of the same material as the erbium doped fiber to the conventional EDFA. Also, the characteristics of the EDFA can be easily changed by controlling the length of the absorber. Furthermore, the gain in a wavelength range usually used in transmission can be increased, and noise figure can be lowered.

What is claimed is:

1. An optical fiber amplifier with an absorber comprising:
   a first amplification unit for amplifying input signal light comprising:
      a first pump light source for outputting first pump light having a first center wavelength;
      a first wavelength selective coupler (WSC) having a first input port for receiving the input signal light, a second input port connected to the first pump light source, and a first output port, for coupling signals input via the first and second input ports and outputting coupled light through the first output port; and
      a first erbium doped optical fiber connected to the first WSC, for amplifying the input signal light using stimulated emission caused by the first pump light;
   an absorption unit for separating the input signal light and the first pump light from output light of the first amplification unit and absorbing light in a wavelength range and comprising:
      a second WSC having a third input port connected to the first amplification unit, and second and third output ports, for selectively outputting, from the light output from the first amplification unit and received via the third input port, a signal light through the second output port, and the first pump light through the third output port;
      an absorber comprising a second erbium doped optical fiber having a first end connected to the second output port of the second WSC, for absorbing the signal light output from the second output port in a wavelength range where amplification gain is relatively high;
      a transmission optical fiber connected to the third output port of the second WSC, for transmitting the first pump light entering via the third input port; and
      a third WSC having a fourth input port connected to a second end of the second erbium doped optical fiber, a fifth input port connected to the transmission optical fiber, and a fourth output port, for coupling signals entering via the fourth and fifth input ports and transmitting coupled light through the fourth output port; and
   a second amplification unit for amplifying signal light output by the absorption unit and comprising:
      a second pump light source for outputting second pump light having a second center wavelength;
      a third erbium doped optical fiber connected to the absorption unit, for amplifying signal light output by the absorption unit by stimulated emission caused by the second pump light from the second pump light source; and
      a fourth WSC having a sixth input port connected to the third erbium doped optical fiber, a seventh input port connected to the second pump light source, and a fifth output port for outputting a signal amplified by the third erbium doped optical fiber.

2. The optical fiber amplifier with an absorber as claimed in claim 1, wherein the first and third erbium doped optical fibers are doped with erbium in a first concentration and the second erbium doped optical fiber is doped with erbium in a second concentration higher than the first concentration.

3. The optical fiber amplifier with an absorber as claimed in claim 1, wherein the first and third erbium doped optical fibers have respective first and second lengths and the second erbium doped optical fiber has a third length shorter than the first and second lengths.

* * * * *